Patented Mar. 23, 1943

2,314,340

UNITED STATES PATENT OFFICE 2,314,340

COATING GRANULAR MATERIALS AND PRODUCT THEREOF

John A. Brown and John Edmund Clarke, St. Paul, Minn., assignors to Minnesota Mining & Manufacturing Company, St. Paul, Minn., a corporation of Delaware No Drawing. Application July 13, 1940, Serial No. 345,538. In Canada October 28, 1938

15 Claims. (Cl. 51—295)

This invention relates to improvements in the bonding of materials. More particularly it concerns especially an improvement in the bonding of abrasive grits or granules. This application is based upon our copending application Serial No. 171,990, filed October 30, 1937.

In the making of bonded abrasive articles such as sandpaper one of the commercial tests of quality is the "grain retention test" or "mineral loss test." It is of course desirable that the grain retention be as good as possible and that the mineral loss be as low as possible. In accordance with these objectives, the present invention is concerned with improving the adhesive strength of the bond between surfaces of abrasive grits and the surrounding adhesive or resinous material, i. e. between the abrasive and the rest of the bonded abrasive article.

It has long been known in the abrasive art that the usefulness of bonded abrasive articles, e. g. sandpaper or other bonded abrasive articles, could be somewhat improved by preparing the surfaces of the granular abrasive particles or grits in certain heretofore known ways so that better adhesion to the bond or adhesive would be obtained. For example, it has long been known that when granular abrasive particles are roasted, i. e. to remove any foreign organic substance or oils from their surfaces, the resulting abrasive grits have improved adhesive to glue and other water-miscible adhesive bonding materials. It has also been suggested in the prior art that the adhesion of abrasive grits or particles could be improved by a treatment which results in fused prominences of fluxed clay being attached to surfaces of the abrasive grits; see Nicholson Patent No. 1,910,444. Some subsequent refinements have been worked out commercially in the use of materials fused in situ on the surfaces of abrasive grits. Hereinafter a comparison of the tensile strengths of test briquettes made up with abrasive grits variously treated, including abrasive grits treated according to our present invention, will be presented.

As above indicated, the coating of abrasive grits or grains with fused siliceous, metallic and like materials, with a view to producing rough edges and/or prominences on the surfaces thereof, is known to us. Such coatings or treatments, within our knowledge, embodying fusion or vitrification in situ on the surfaces of the grits of the coating ingredients employed, involve the idea or assumption that the bonding strength between the abrasive grits and a body or coating of adhesive or resinous material can be increased by increasing the roughness or "tooth" of surfaces of the grits and hence increasing its mechanical bonding to adhesive or resin bonds. See Nicholson Patent No. 1,910,444.

We have discovered that the problem of getting good adhesion to resins, glue and the like, that is in securing good qualities of grain retention and low mineral loss in abrasive articles such as sandpaper, is very greatly influenced by whether or not good adhesion of the resin or glue to surfaces of the abrasive grits themselves is secured before the adhesive sets, and that the roughness or smoothness of surfaces of the abrasive grits is of relatively minor consequence. That is, it is common to have abrasive grits encased in a socket of resin or glue without any, or with relatively little adhesion between the surfaces of the grits and the surrounding organic bond, resin or the like.

We accordingly were concerned especially with getting the glue, resin or the like to adhere to the surfaces of abrasive grits in the first instance, and to adhere strongly, as distinguished from merely surrounding but not adhering to, or not tightly adhering to, surfaces of the grits, much like a thoroughly dry sponge may be plunged into a container of water without being appreciably wetted.

We desired to apply to abrasive grits something which, by capillarity of some physico-chemical action or attraction or the like, would cause resins, glues or adhesives, when in fluid or plastic state, to make good contact with surfaces of the abrasive grits and hence secure a strong adhesive bond. We discovered that we could accomplish this result to a high degree by applying a ceramic material, a hydroplastic mineral material, or like material, e. g. a clay slurry, to surfaces of the grits or granules and then heating the thus coated grits to an extent sufficient to dry the coating and render it sufficiently adherent to stay in place while the grits were being bonded, i. e. heat short of fusion or vitrification. This yielded a coating of foraminous, porous nature which, by capillary or some such attractive force, will cause glue, resins and the like to really, definitely contact the surfaces of the abrasive grits and to thus form a firm bond therewith in the first instance.

It will therefore be evident that it is imperative that fusion of the clay coating should be avoided because, upon fusion, the foraminous or porous nature of the coating is lost and the coating would then be unable to foster the desired attractive force or affinity between the liquid or plastic adhesive and the grit surfaces.

Despite the fact that such coatings have very low mechanical strength as compared with a fused clay coating or fused prominences of clay, we have nevertheless found that a very significant improvement in adhesion and in grain retention in abrasive articles can be secured by ignoring various suggestions of the prior art concerning increasing mechanical adhesion by a fused coating made up of fused prominences and, instead, by employing an unfused coating having pores or foramina to accomplish the results above discussed.

It is therefore an object of our invention to produce coated granules or abrasive grits which will produce a stronger bond with adhesive materials such as glue, natural and synthetic resins and the like. A further object of this invention is to coat granules or abrasive grits with a material which yields a coating having pores or foramina extending from the periphery of the coated particle to the surfaces of the abrasive grit itself. A further object is to provide a coating as just described which is bonded strongly enough so that it will stay in place sufficiently well during the bonding operation, e. g during the manufacture of sandpaper, but is readily removed from the surface of the grains, as by rubbing, and hence does not interfere with or deleteriously affect the coating qualities of the finished bonded abrasive article. A further object of this invention is to make bonded abrasive articles comprising abrasive grits having a porous or foraminous coating as just described.

Differently stated, it is an object of our invention to first coat a granular mineral with a finely divided solid material of a crystalline or amorphous nature, having a multiplicity of interstitial surfaces, and in this treatment adhere and bond the surfacing material as a discontinuous or open network coating about and upon the granular base, retaining a multiplicity of such interstitial surfaces or pore surfaces in a substantially intact relation for affording strong capillarity to a liquid or mobile bonding material or adhesive, which when applied will adhere more tenaciously and with greater efficiency to the granule, giving the finished article a greater durability, strength and consequently greater utility as an abrasive. This method of preparing abrasive minerals has several other advantages which will be recognized as additional objects and purposes of this invention. Because of the greater adhesive strength of bonds to granules or grits so treated, it is practical to use less bonding material or adhesive and to thereby achieve an abrasive coating, or coated abrasive article, having a greater difference in the respective heights of the abrasive grains and the bond than heretofore was possible, thus in the case of sandpaper producing a more rugged abrasive sheet with greater cutting ability. That is, with the abrasive grits protruding farther from the bond, they will penetrate the work farther and present less clogging difficulty than in abrasive articles where the abrasive grits protrude only a short distance above the average height of the bond. Another advantage is that the coated grains of the present invention, due to the presence of their porous or foraminous, unfused ceramic or like coating, have an affinity for liquids which tends to regulate the moisture content of bonded abrasive articles in such a manner as to prevent excessive drying out and consequent deterioration of the article.

In general, we contemplate using as a coating, a finely divided inorganic mineral material having a great affinity for liquids, the so-called non-metallic mineral materials such as clays, silica, etc. ordinarily being preferred. The degree of adherence and the measure of its partiality to a liquid determines the type of substance which we desire to use with our respective bonding materials. For example, an adhesive dissolved in water may be more efficient with one type of coating on the grits than an adhesive dissolved in an organic solvent, to the exclusion of water; but while we may illustrate our invention with relation to a particular type of product, of course we do not intend to be limited by any specific illustrations.

While our invention has some application to the bonding of granules generally for securing them to a bonding means, our invention is illustrated primarily by its application to abrasive granules or grits of a refractory nature, such as silicon carbide, aluminum oxide, and the like, which particularly require firm bondage in the abrasive article, e. g. to a backing in the case of sandpaper.

An additional object of this invention is the provision of a coating material which may be used of and in itself with an adhesive material dissolved in either an aqueous or an organic solvent, or with a hydrophilic or an organophilic adhesive or resin, with or without further treatment, which is hereinafter set forth, for further increasing the affinity of the unfused ceramic or other highly porous unfused coating.

Our invention essentially differs from prior methods which have been suggested, within our knowledge, in that when heating the coated mineral we maintain the temperature below a point at which fusion or vitrification of the coating would take place so that individuality of the finely divided solid particles of, or the interstitial crystalline structure of the coating is not lost. Under the conditions of applying a coating for the purpose herein described, it is an object of our invention to maintain the temperature at such a range below the fusion point of the coating material that the resulting granule has a coating thereon set up or baked in non-vitrified and unfused state. Our present investigation indicates that heating to a temperature of approximately 150° C. (330° F.) below the starting of incipient fusion or vitrification maintains the coating material's physical properties in desirable state and avoids fusion, yet causes sufficient bonding or baking of the coating material onto the surfaces of the granules or grits to maintain the coating in place during the bonding operation or the making of abrasive articles such as sandpaper.

It is to be understood that we may use various so-called non-metallic mineral materials or ceramic materials of a fine grained nature, such as for example, clays of the types known as kaolin, bentonite, slip, Kentucky, New Jersey, Ohio, Florida, Dakotas, Minnesota Chaska, various glacial lascustrine and marine clays, silica fines, bauxites, certain cements, and other products having like characteristics which may be applied with or without a filling agent and slightly altered methods, but for the purpose of accomplishing in effect the results herein described. It is to be understood, however, that with the use of these various materials the actual coating temperature used will depend upon the fusion point of the particular substance employed, and will be maintained so as to avoid fusion and to secure a porous, foraminous coating.

Our invention is not restricted to any specific structures, materials, or ingredients used in the make-up of coated articles, but aims broadly to provide improved coated grits or granules which, according to the principle above set forth, provide a material improvement in adhesion of the granules or grits in structures comprising the same to improve the combination as a whole, e. g. such as a combination article comprising a base material, a binder or bonding material, abrasive granules and a sizing coat, the composite nature of which is recognized generally in the abrasive trade as sandpaper.

To illustrate our invention, the following description of treating a granular material with Chaska clay is given.

Chaska clay, produced at Chaska, Minnesota, is a glacial lake clay having a point of incipient fusion of approximately 1050° C. A mixture of such clay and water, in the ratio of seven pounds of clay to three pounds of water, is mixed with one hundred pounds of aluminum oxide abrasive grains, that is a granular material of the mesh size termed "Grade 24," i. e. will pass a screen having 24 meshes to the linear inch but will be retained on a screen having 36 meshes to the linear inch, either in a wet or dry state. The grains or grits, coated with such a clay slurry or coating, are then heated to a temperature of approximately 1700° F. or 930° C. while maintained in agitation for a period of one-half hour, as by the use of a direct fired rotary furnace, for example six feet in diameter and rotated at about 4 R. P. M. After this treatment, the material may be applied in a warm or cold state and in an otherwise untreated condition to the bonding material, or it may be dip-washed or sprayed with hot or cold water or subjected to an air stream for removing dust and then applied to the bond. This latter treatment is dependent upon the conditions, such as the nature of the bond, the degree of moisture present in the coating which determines more or less the amount of dust present after heating.

It will be understood that the coating temperature just given above is applicable to the particular clay there employed, i. e. Chaska clay. It would also be suitable for certain other clays but not for all clays or the like. For example, lower fusing clays would require lower temperatures, sometimes of the order of 650° C., 600° C. or less. On the other hand, with relatively high fusing clays, a temperature somewhat above 930° C. could be employed while still avoiding fusion or vitrification. It will be self-evident that, if a flux were added to Chaska clay, or any clay, in substantial amount, the temperature of fusion would be correspondingly decreased and hence the top temperature permissible in our treatment would be correspondingly lower to obviate vitrification and to stay below the temperature of incipient fusion.

With granules treated in the above manner, we have produced an abrasive material having a great affinity for its securing means so that when applied to a binder or bonding material (such as glue or resin adhesive) coated on a base, this affinity, caused and/or aided by the greatly increased surface area, produces capillarity and/or physico-chemical attractive forces in the interstices and pores of the coating material which strongly attracts the bond to the surfaces of the abrasive grits or granules themselves, with the result that an increased bondage with a lower level of the bonding material is produced.

After applying the abrasive mineral to a bonding adhesive in the making of sandpaper, a sizing coat is ordinarily applied, which may be of a nature similar or dissimilar to the binder bond. In any case, however, it is found that the herein described coated abrasive granules or grits play an important part in causing both the bonding and sizing material to form a firm and strong bond to surfaces of the abrasive grits, and thus to more completely unify and strengthen the anchorage of the granular material to its base.

If a grit-bonding or binder coat is used so that it contributes only a minor part of the adhesive force needed for holding the granules in place, a maximum effect is produced by applying a sizing coat over the binder coat and over the layer of abrasive grits. The sizing, by reason of the capillarity of the coatings on surfaces of abrasive grits, tenaciously adheres to such surfaces of the abrasive grits or granular material in the same manner as will the original bonding material and thus contributes to the properties of adhesion and grain retention in the sandpaper.

The following is a comparison of the bonding strengths of differently treated aluminum oxide abrasive grits. The comparison is made on the basis of the briquette tensile strength test, i. e. on the basis of the tensile strength of a ⅜" x ½" section. Glue is used as a standard adhesive.

*Table*

| Treatment of aluminum oxide abrasive grits | Tensile strength in pounds of briquet'e ⅜" x ½" in cross-section |
|---|---|
| Untreated aluminum oxide | 132 |
| Roasted aluminum oxide | 206 |
| Aluminum oxide coated at 900° C. per example at end of page 1 and top of page 2 of Nicholson Patent No. 1,910,444 | 195 |
| T P Aloxite | 292 |
| Aluminum oxide having a porous unfused clay coating produced as hereinabove illustrated | 349 |

The "T P Aloxite" is a trade name for a treated aluminum oxide abrasive now sold by the Carborundum Company of Niagara Falls, New York, and appears to constitute some variation or improvement over that which is disclosed in the aforesaid Nicholson patent. For the sake of completeness there follows a description of the briquette tensile strength test:

A briquette is a mixture of glue and mineral which has been molded to a definite shape and allowed to cure for ten days in a cabinet in which a temperature of 70° Fahrenheit and a relative humidity of 40% to 50% is maintained. The mineral and glue at the start of the briquette procedure are placed in a water bath and held at a definite temperature for a definite length of time. They they are mixed in a beaker and replaced in the water bath for another definite period, at the end of which the mixture is placed in the center of a centrifugal machine from which it is spun out into four different compartments. The centrifuge is rotated at 1850 R. P. M., and each compartment is equipped with a mold for forming the briquette. The briquette is removed from the mold after the glue has jelled and is then placed in the curing cabinet. The briquette is larger at each end and necked down in the center to provide a section area of about $\tfrac{3}{16}$ of a square inch (⅜" x ½"). Each end (from an end view) is rectangular substantially 1" x ⅜". When subjected to tension in the testing machine, the briquette will pull apart at a central point where its cross-section is smallest.

At the end of the curing cycle the briquette is tested in a tensile testing machine. The stress at the point of rupture is recorded for each briquette and, as four briquettes are made at one time, the average of the four figures is recorded as the adhesion value of that particular treatment. As stated above, the figures recorded do not represent any particular units such as pounds per square inch. These could be calculated from the data above indicated, but as the test has been used only to show comparative strengths it has not been felt necessary or desirable to state these figures in, or convert such figures into any common units such as lbs./sq. in.

The briquette tensile strength test or adhesion test is described still more in detail in the affidavit of Gilbert G. Willson executed October 28, 1939, of record in the file of our parent application Serial No. 171,990, filed October 30, 1937.

In general, for carrying out purposes of our invention, we may mix a clay with water in proportions by weight varying within the range of from 5 to 10 parts of clay to one to five parts of water per 100 parts of granular material of the size hereinabove referred to as "Grade 24." The size of the grain will determine the amount of clay per 100 parts by weight of mineral to compensate for the changes in surface area due to the varying sizes of the grain.

The amounts of water and clay for a single run can vary within small limits without making any great difference in the color or adhesion of the final product when the firing temperature is maintained substantially constant. However, to more accurately control natural colors, a change in the amount of clay per run is desirable depending upon firing conditions. In general, the change of natural color and the amount of clay resulting on a finished product is found to be determined principally by these factors: length of firing time, the speed of mixing and the size of the run.

We some times find it desirable to introduce an alkali earth metal (such as magnesium, calcium and the like) in the form of an oxide or halide etc. and/or a powdered, fibrous organic material such as "Keltex" (a fibrous powder derived from seaweed, i. e. a marine vegetable product which is an algenate) with the clay-like materials to aid in the production of a loose fluffy porous coating on the abrasive particle which increases the affinity of the coating for the bonding medium and makes for an easier and more thorough penetration of the adhesive bond into and through the pores of the coating material to surfaces of the abrasive grits. For example, we may use a fifty-fifty mixture of magnesium chloride and clay, or a sixty-forty mixture of magnesium chloride and clay will some times be advisable. A small proportion of "Keltex" mixed with the clay before coating gives improved results also. An amount of "Keltex" of the order of one (1) percent or even less, based on the clay, is sufficient to provide the desired effect. After the granules are heated above the point of decomposition of the alkali earth halide, or above the point where the "Keltex" has been completely burned out, a very porous coating of the clay remains. However a coating produced from a clay slurry alone, in the absence of such additional materials, when solidified and baked on surfaces of abrasive grits at a temperature below the fusion or vitrification stage, yields a porous, foraminous coating which provides a high bonding power of the abrasive grits to liquid or plastic adhesives, without any additional material, as hereinabove illustrated. However the use of such additional material as "Keltex" will further illustrate the type of porous, foraminous coating found by us to be desirable.

It is to be carefully observed that, in the case of the use of clays and various other so-called non-metallic minerals which tend to vitrify and fuse above certain respective temperatures, it is important to keep the temperature down to a point where fusion will be avoided, to the end that a highly porous, foraminous coating is attained, which, while having relatively little mechanical bonding strength as compared with a fused coating or fused prominences, serves as above described to promote and effect a strong adhesive bonding, in the first instance, of a liquid adhesive, resin or the like (before and during setting) to surfaces of abrasive grits.

The above illustrations, which have been given, more generally contemplate the application of a coated granule material of a nature herein described to a water type bond or adhesive, or a water-miscible resin or adhesive, whether of the type of glue or other protein adhesives, casein or the like, or whether involving synthetic resins such as water-miscible phenol-aldehyde resins, polyvinyl alcohol resins, etc. However we have found that a further treatment renders the porous ceramic or like coatings of the grits more applicable to water-immiscible, organic solvent adhesives, particularly to an oil-soluble type of adhesive. As an illustration of this further treatment in addition to the above steps, we heat the coated granules at a somewhat lower temperature, e. g. approximating 400° C. or higher, for about one hour to drive off as fully as possible the moisture naturally inherent in the clay particles, which moisture may be disadvantageous in the case of certain organic bonds or adhesive binder coats. After heating, and preferably while hot, the coated material is quenched in an organophilic liquid, saturation occurring due to the penetration of the liquid.

Media into which the coated granules may be quenched are those having a great affinity for organic type bonds, as furfural, benzaldehyde, resinous solutions, and the like.

We have also found a method for further treating porous ceramic coated abrasive grits to secure better adhesion of an organophilic bond thereto, as follows: quench the granules, either in a heated or cooled condition, in a liquid consisting of a water-soluble phenol-formaldehyde resin dissolved in water. The water is allowed to evaporate, leaving a resinous deposit on the surface of the crystalline interstitial structure of the coating of the granule which adds to the affinity or capillary attraction of the porous or interstitial grit coatings for an organic bond.

For treating the material in a little different form than the above described, particularly after it has been cooled and may have been standing for some time, we use, for example, 5 c. c. of benzaldehyde per gallon of the granular material and, after thoroughly mixing the granules therewith for about one-half hour, the granules are then ready for application to a bond or adhesive binder for making up an abrasive article such as sandpaper.

As an alternative method of treatment, we have found that by applying with our clay coating a deposit of carbon material we increase the adhesion of the organophilic type bond for the granular mineral. As an illustrative method of obtaining a carbon deposit on the granules and on the interstitial or pore surfaces of the coating, we treat 1000 grams aluminum oxide with 50 grams of clay suspension (66⅔% solid), and 70 grams of thin corn syrup. After thorough mixing, this mineral is heated at a temperature of approximately 750° C. (1380° F.), with agitation, for one-half hour, this heating causing carbonization of the corn syrup to provide the carbon deposit.

This carbonizing treatment may be put on subsequent to the application and setting up of the porous ceramic coating as in the previous illustrations by a separate treatment, as for example, by applying a coating of sugar or the like in the form of a solution with the subsequent application of heat for carbonization. It is to be clearly understood that the above mentioned additional or auxiliary treatments are for further aiding in capillary attraction and that the coated granules may be applied without such treatment to either an organophilic or hydrophilic adhesive.

After coating the abrasive granules, we often find it necessary to re-sift the mineral for securing a uniform size of coated material. The larger rejected granular particles are re-crushed in a suitable breaking mill and the broken minerals are re-treated to secure a complete coverage.

A further material advantage which we have secured by application of a coating of the nature herein described is that the coated granular material or grits may be reused without, however, re-treating for the purpose of re-coating after having been bonded to an abrasive sheet and the bond and sheet destroyed by burning and dissolving, leaving the granules free for re-application to a new abrasive bond.

With the above description illustrative of our invention, we have secured a coated granule or abrasive particle which is adapted to form a more firm bond with an adhesive or securing means. Further, we have produced a coated granule or grit which tends to retain a moisture content sufficient to prolong the life of the composite structure either in its natural state or when treated with water-resisting materials, as in the carbonizing or oil treatments heretofore expressed, and which when subsequently added to an organophilic or hydrophilic bond secures a flexibility and stability between bonding means and granular particles and a strength of adhesion heretofore unknown to us.

We claim:

1. An abrasive particle or grit having on the surfaces thereof a porous, foraminous coating adapted to foster strong adhesive bonding of a fluid adhesive to surfaces of said abrasive grit by capillary attraction, said foraminous coating being of unfused, unvitrified nature.

2. An abrasive particle or grit having on the surfaces thereof a porous, foraminous clay coating baked in situ and adapted to provide a strong adhesive bonding of a hydrophilic liquid glue adhesive to surfaces of said abrasive grit through the pores and foramina of said clay coating by capillary attraction, said clay coating being of unfused, unvitrified nature.

3. A bonded abrasive article comprising a flexible sheet base, coated abrasive grits and an adhesive bond for uniting said grits in integral relation to said base or backing, said coated abrasive grits comprising grits having surfaces thereof coated with a porous, foraminous, unfused and unvitrified coating adapted to foster strong adhesion of said adhesive bond to surfaces of said abrasive grit by capillary attraction of said adhesive in fluid form.

4. As an article of manufacture, a granular material, individual base granules thereof having a coating of a crystalline nature bonded thereon, said coating being set up about each of said individual granules in a non-fused state and having interstices extending from the periphery of individual coated granules inwardly to the surface of the base granules thereof, said coating being of such character as to improve the adhesive union between the said base granules and a liquid solidifiable coating material.

5. As an article of manufacture, a base granule, a coating of a ceramic nature surrounding and bonded to said granule, said coating being in a non-fused state and having interstices or capillary passages extending from the periphery of the coated granule to the surface of said base granule, and an organic coating material, mobile (i. e., fluid or plastic) at higher temperatures and solid at lower temperatures, at least partially surrounding said coated granule, the first-mentioned coating being of such character as to improve the bond between said organic coating material and said base granule by capillary attraction.

6. An abrasive article comprising a plurality of abrasive granules bonded in integral relation with each other, each of said granules comprising a base granule, a coating of hydroplastic heat-resistant mineral material on said base granule, said coating being in a non-fused, unvitrified state and having small passages or interstices extending from the exterior of said coating inwardly to the surface of said base granule, and a bonding material, which is applied in fluid or plastic state and which solidifies after application, at least partially surrounding said granule and uniting the same in integral relation with other similarly coated granules, said coating being of such character as to improve and increase the strength of the bond between said base granules and the aforesaid bonding material by capillarity.

7. As an article of manufacture, a base granule, a coating of hydroplastic heat-resistant mineral material at least partially surrounding and joined to said base granule, said coating being in a non-fused state and having interstices or small passages extending from the periphery of said coating to the surface of said base granule, and a thermoplastic adhesive material at least partially surrounding the aforementioned coated base granule and bonded thereto, the last-mentioned material being of such character that its bond with said base granule is improved and strengthened by virtue of the capillary attraction provided by the said interstices and small passages of said coating of hydroplastic mineral material.

8. An abrasive article comprising a plurality of abrasive granules bonded in integral relation with each other, each of said granules comprising a base granule, a coating of clay-like material substantially surrounding and adhering to said base granule, said coating being in unvitrified form and having small passages or interstices extending from the exterior surface of said coating to the surface of said base granule, and an organic bonding agent, in mobile state during application and which solidifies thereafter, at least partially surrounding said granule and uniting the same in integral relation with other similarly coated granules, the strength of the bond between said bonding agent and said base granule being increased by virtue of said coating of clay-like material.

9. A comminuted or granular material having an unfused porous coating of clay-like material loosely bonded to surfaces of individual grains or granules of said material, in which the ratio of clay to the total surface area of granules coated is of the order of that existing where from about 5 to 10 parts by weight of clay are coated on 100 parts of grains or granules which will pass a screen having 24 meshes to the linear inch but will be retained on a screen having 36 meshes to the linear inch.

10. In the manufacture of an article in which an organic material, which is mobile during application and solidifies thereafter, is bonded to base granules, the steps of process precedent to bonding said material to said base granules which include individually coating said base granules with a dispersion or slurry of a hydroplastic ceramic material and setting up the ceramic coating material on the surfaces of said base granules, and rendering said coating porous, by heating the coated granules to a temperature high enough to evaporate the liquid dispersing agent or vehicle and to cause adhesion of the coating upon the surfaces of the granules but below the point at which any substantial fusion of the said coating material takes place, thereby producing coated granules which can advantageously be bonded with a material of the type first described above.

11. In the manufacture of an article in which a material, which is mobile during application and solidifies thereafter, is bonded to granules, the method of improving the bonding characteristics of such granules which comprises coating individual base granules with an argillaceous or clay-like material dispersed in a vehicle and setting up the argillaceous coating on the surfaces of said base granules and producing interstitial spaces in said argillaceous coating, extending from the exterior thereof inwardly to the surfaces of said base granules, by heating the coated granules within a temperature range below fusion temperatures of said argillaceous material, thereby producing coated granules which by capillarity and physico-chemical attraction will foster bonding with liquid resins and organic adhesives.

12. In the manufacture of an article in which a granular material is bonded in integral relation with a fibrous sheet material, the steps of process which comprise coating individual granules with a dispersion or slurry of a ceramic material and setting up the ceramic coating material on the surfaces of said granules and rendering said coating porous and foraminous by heating the coated granules to a temperature approaching but below the point at which any substantial fusion of said ceramic coating material would take place, applying a coat of organic adhesive bonding agent to a surface of said fibrous sheet material, mixing coated granules, produced as above described, with said bonding agent while the latter is in mobile condition, (i. e., in plastic or fluid state), and allowing said bonding agent to harden, whereupon a bond is set up between said granules and said bonding agent, and through the latter with said sheet material, which is of increased strength due to the aforementioned pores and foramina in the coating of ceramic material applied to said granules.

13. In the manufacture of an article in which a granular material is bonded in integral relation with a sheet material, the steps of process which comprise coating individual base granules with a ceramic material dispersed in a vehicle and setting up the ceramic coating on the surfaces of said base granules and producing interstitial spaces and pores in said ceramic coating, extending from the exterior thereof inwardly to the surfaces of said base granules, by heating the coated granules to a point approaching but below the temperature of incipient fusion of said ceramic material, applying a coat of adhesive organic bonding agent and a layer of coated base granules, produced as above described, to a surface of said sheet material, said granules being embedded to substantial extent in said bonding agent while the latter is maintained in mobile condition, and allowing said bonding agent to harden, whereupon a bond is set up between said base granules and said bonding agent, and through the latter with said sheet material, which is of increased strength due to the aforementioned pores and interstices in the said coating of ceramic material.

14. The method of improving the bonding characteristics of granular material when bonded with organic bonds which comprises coating individual grains or granules of said granular material with a slurry of a ceramic material, drying the thus coated grains and heating the same to a temperature high enough to produce a porous, foraminous coating and to cause adhesion of the coating upon the surfaces of the said grains but below the point at which fusion of the coating would take place, and then applying to the ceramic coated grains a material having a substantially stronger affinity for organic bonding agents of the water-insoluble type than does the aforementioned ceramic coating.

15. As an article of manufacture, a granular material, individual base granules thereof having a coating of clay-like material over the surface thereof, said coating of clay-like material being set up about each of said individual base granules, in a non-fused or unvitrified state and having a foraminous, interstitial structure providing small passages extending from the periphery of individual coated granules substantially to the surface of the base granule thereof, said coated granules being adapted for use in producing an integral structure in which said granules are bonded together with an organic material which is mobile at elevated temperatures but solidifies at lower temperatures, said coating of clay-like material serving to increase the strength of such bond.

JOHN A. BROWN.
JOHN EDMUND CLARKE.